(12) United States Patent
Tsirkin

(10) Patent No.: US 11,494,213 B2
(45) Date of Patent: *Nov. 8, 2022

(54) VIRTUAL MACHINE MEMORY MIGRATION BY STORAGE

(71) Applicant: Red Hat Israel, Ltd., Raanana (IL)

(72) Inventor: Michael Tsirkin, Raanana (IL)

(73) Assignee: Red Hat Israel, Ltd, Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,158

(22) Filed: Mar. 22, 2019

(65) Prior Publication Data
US 2019/0220302 A1    Jul. 18, 2019

Related U.S. Application Data

(63) Continuation of application No. 13/753,156, filed on Jan. 29, 2013, now Pat. No. 10,241,814.

(51) Int. Cl.
    *G06F 9/455*     (2018.01)

(52) U.S. Cl.
    CPC .. *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,868,897 B2 | 1/2011 | Vembu et al. | |
| 8,832,390 B1 | 9/2014 | Ahmad et al. | |
| 9,201,612 B1* | 12/2015 | Vincent | G06F 3/0662 |
| 9,367,453 B1* | 6/2016 | Clark | G06F 12/08 |
| 9,384,035 B2* | 7/2016 | Ito | G06F 9/4856 |
| 9,405,648 B2 | 8/2016 | Tsirkin | |
| 10,635,997 B1* | 4/2020 | Roth | H04L 67/32 |
| 2008/0127182 A1 | 5/2008 | Newport et al. | |
| 2008/0270564 A1 | 10/2008 | Rangegowda et al. | |
| 2010/0186011 A1 | 7/2010 | Magenheimer | |
| 2011/0197039 A1 | 8/2011 | Green et al. | |

(Continued)

OTHER PUBLICATIONS

U.S. Appl. No. 13/753,285, Non-Final Office Action dated Sep. 1, 2015.

(Continued)

*Primary Examiner* — Wynuel S Aquino
(74) *Attorney, Agent, or Firm* — Lowenstein Sandler LLP

(57) ABSTRACT

Systems and methods for virtual machine memory migration by storage are provided. A method includes receiving a request to migrate a virtual machine from a source host to a destination host. The method further includes mapping, by the source host, a memory of the virtual machine to a storage device accessible over a network by the source host and by the destination host. The method further includes caching, by the source host, a portion of a state of the virtual machine. The method further includes issuing a synchronization command to synchronize the portion of the state of the virtual machine with the storage device. Responsive to determining that a time period to complete the synchronization command is below a threshold time period, the method further includes stopping the virtual machine on the source host. The method further includes starting the virtual machine on the destination host.

20 Claims, 4 Drawing Sheets

(56) References Cited

U.S. PATENT DOCUMENTS

| | | |
|---|---|---|
| 2011/0264788 A1 | 10/2011 | Costa |
| 2011/0302577 A1 | 12/2011 | Reuther et al. |
| 2011/0320556 A1 | 12/2011 | Reuther |
| 2012/0017031 A1 | 1/2012 | Mashtizadeh et al. |
| 2012/0054367 A1 | 3/2012 | Ramakrishnan et al. |
| 2012/0110237 A1* | 5/2012 | Li .................... G06F 9/45558 711/6 |
| 2013/0014103 A1 | 1/2013 | Reuther et al. |
| 2013/0074065 A1* | 3/2013 | McNeeney .......... G06F 11/141 718/1 |
| 2013/0097369 A1* | 4/2013 | Talagala .............. G06F 12/0804 711/103 |
| 2013/0117744 A1 | 5/2013 | Klein et al. |
| 2013/0185420 A1* | 7/2013 | Shimogawa ........ G06F 9/45558 709/224 |
| 2013/0346613 A1 | 12/2013 | Tarasuk-Levin et al. |
| 2014/0025890 A1 | 1/2014 | Bert et al. |
| 2014/0033201 A1* | 1/2014 | Dawkins ............. G06F 11/1484 718/1 |
| 2014/0059539 A1 | 2/2014 | Simonsen et al. |
| 2014/0115162 A1* | 4/2014 | Kalyanaraman ........ H04L 45/72 709/226 |
| 2014/0173213 A1 | 6/2014 | Beveridge |
| 2014/0215172 A1 | 7/2014 | Tsirkin |
| 2014/0215459 A1 | 7/2014 | Tsirkin |

OTHER PUBLICATIONS

U.S. Appl. No. 13/753,285, Non-Final Office Action dated Jan. 6, 2015.
U.S. Appl. No. 13/753,285, Final Office Action dated Apr. 20, 2015.
U.S. Appl. No. 13/753,285, Advisory Action dated Jul. 8, 2015.
U.S. Appl. No. 13/753,285, Final Office Action dated Dec. 9, 2015.
U.S. Appl. No. 13/753,285, Advisory Action dated Feb. 23, 2016.
Feiner, P., "Exogenous Memory Management via -Mem-Path," Downloaded from http://lists.gnu.org/archive/html/qemu-devel/2012-11/msg02024.html. 4 pages.
Lin, "Virtual Memory" 2003, http://www.cs.umd.edu/.
USTPO, U.S. Appl. No. 13/753,285, Notice of Allowance dated Apr. 1, 2016.

* cited by examiner

VIRTUAL MACHINE MEMORY MIGRATION BY STORAGE

RELATED APPLICATION

This application is a continuation application of U.S. patent application Ser. No. 13/753,156, filed Jan. 29, 2013, the entire content of which is hereby incorporated by reference herein.

TECHNICAL FIELD

Embodiments of the present disclosure relate to a computer system, and more specifically, to a method for migrating a virtual machine by storage.

BACKGROUND

A virtual machine (VM) is a portion of software that, when executed on appropriate hardware, creates an environment allowing the virtualization of an actual physical computer system. Virtualization permits multiplexing of an underlying host computer between different virtual machines. The host computer typically allocates a certain amount of its resources to each of the virtual machines. Each virtual machine can then be able to use the allocated resources to execute applications, including operating systems (referred to as guest operating systems (OS)). The software layer providing the virtualization is commonly referred to as a hypervisor and is also known as a virtual machine monitor (VMM), a kernel-based hypervisor, or a host operating system. The hypervisor usually emulates the underlying hardware of the host computer, making the use of the virtual machine transparent to the guest operating system and the user of the computer. A VM may have a virtual processor, virtual system memory, virtual storage, and various virtual devices.

Virtual machines may be migrated between a source host computing platform ("the source host") and a destination host computing platform ("the destination host") connected over a network, which may be a local-area network or a wide area-network that may include the Internet. Migration permits a clean separation between hardware and software, thereby improving facilities fault management, load balancing, and low-level system maintenance.

One method of migrating virtual machines between a source host and a destination host over a network is to suspend the source VM, copy its state to the destination host, boot the copied VM on the destination host, and remove the source VM. This approach has been shown to be impractical because of the large amount of down time users may experience. A more desirable approach can be to permit a running source VM to continue to run during the migration process, a technique known as live migration. Live migration typically permits a running VM to be moved between different physical machines without disconnecting a running client or application program. For a successful live migration, memory, storage, and network connectivity of the VM should be migrated from the source host to the destination host. While the VM on the source host is running, its memory can be copied to another physical machine. Memory on the source VM can change during the memory copy process. If the memory of the source VM changes, the changed memory can be copied to the other physical machine. When a rate of change of the memory is below a threshold, the VM on the source can be suspended and the state of the suspended VM, including memory, storage, and network connectivity, can be copied to the other physical machine.

The time between suspending the VM on the source host and resuming the VM on the destination host is known as "down-time." A down-time of a live migration employing previous techniques may be lengthy—especially for migration between geographically remote hosts—and is approximately proportional to the size of memory and applications running on the source VM.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for live virtual machine migration are described herein. In one implementation, upon receiving a request to migrate a virtual machine from a source host to a destination host, a hypervisor on the source host maps memory of the virtual machine on a storage device accessible by the source host and by the destination host, and initiates live migration of the virtual machine. Performing live migration of the virtual machine from the source host to the destination host can include a pre-synchronize memory migration stage and a post-synchronize memory migration stage. The pre-synchronize phase has two phases. During the first phase of the pre-synchronize stage, the warm-up phase, changes of memory pages for the virtual machine on the source host are monitored while the virtual machine is still running on the source host. For example, the monitoring can be performed using virtual machine memory cached on the source host. The pre-synchronize phase can continue until memory page changes become minimal. During the second phase of the pre-synchronize stage, the stop-and-synchronize phase, the virtual machine on the source host is stopped and the cached memory is synchronized with the storage device. A virtual machine can be started on the destination host and the memory of the virtual machine on the destination host can be mapped on the storage device. In the post-synchronize memory migration stage, the source virtual machine is suspended at the source host and a minimal execution state of the source virtual machine (e.g., CPU, registers, non-pageable memory) is transferred to the destination host. The destination virtual machine is then resumed at the destination host.

Accordingly, embodiments of the present disclosure provide a high availability solution for live virtual machine migration that reduces the downtime of a virtual machine being migrated and the overall time for completing the live migration process.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
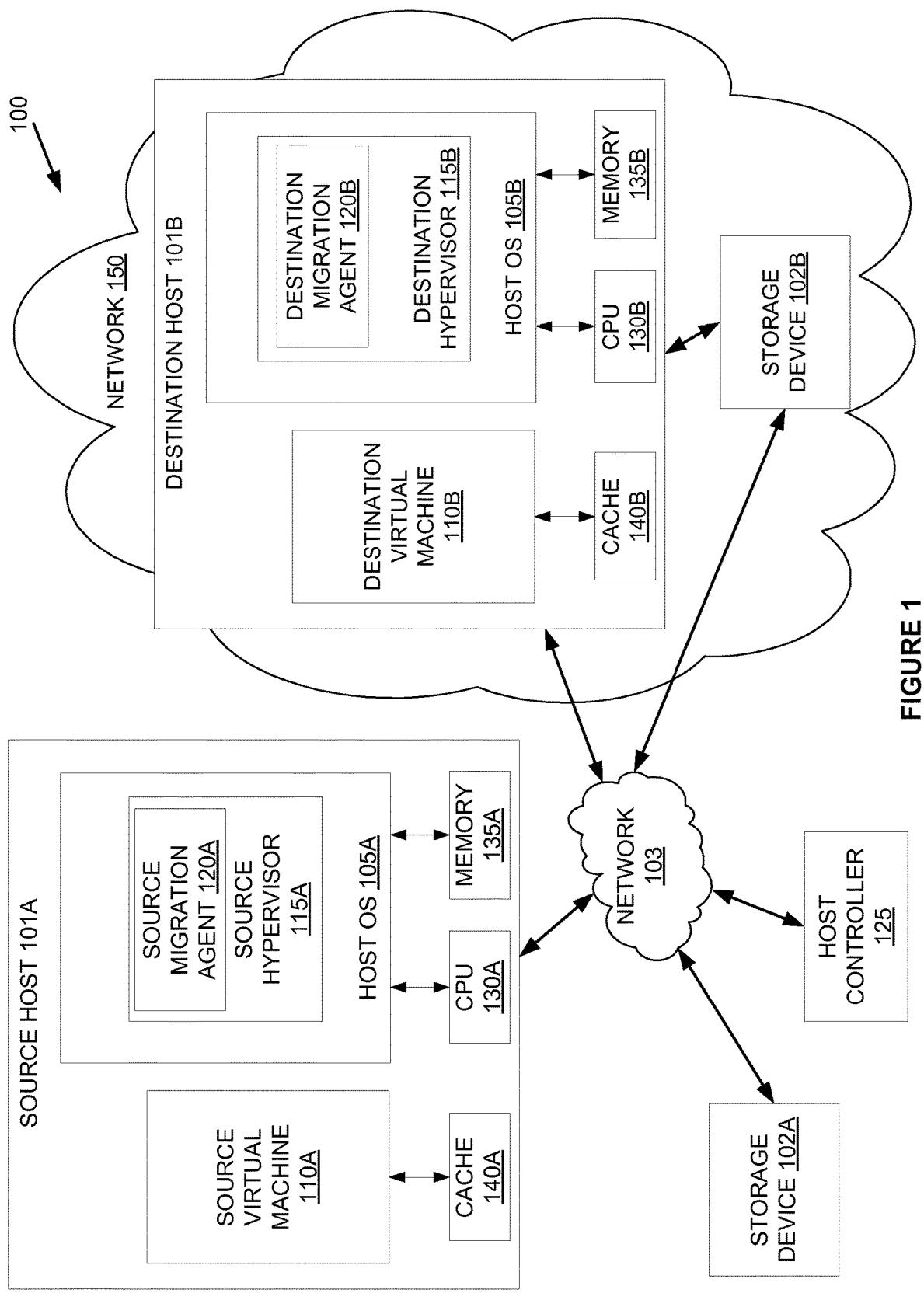
FIG. 1 is a block diagram that illustrates an embodiment of a source host computer system, a storage device, and a destination host computer system in which embodiments of the present disclosure may be implemented.

FIG. 1 illustrates sample virtualization architecture 100 in which embodiments may operate. The virtualization architecture 100 may include a source host computer system 101a (the "source host 101a"), one or more storage devices 102 (e.g., 102a, 102b), and a destination host computer system 101b (the "destination host 101b"). The source host 101a, any storage devices 102, and destination host 101b may be communicably connected over a network 103, which may be a private network (e.g., a local area network (LAN), a wide area network (WAN), intranet, etc.) or a public network (e.g., the Internet).

The source host 101a and destination host 101b can be a server, a workstation, a personal computer (PC), a mobile phone, a smart phone, a mobile computing device, a personal digital assistant (PDA), tablet, laptop computer, thin client, etc. The source host 101a and the destination host 101b can include hardware components such as one or more physical central processing units (CPUs) 130a-130b, memory 135a-135b, and other hardware components.

A source host 101 can include one or more virtual machines 110a and run an operating system 105 ("host OS") to manage its resources. A virtual machine 110a can run a guest operating system. In one embodiment, the source host 101a runs a source hypervisor 115a to virtualize access to the underlying source host hardware, making the use of the source virtual machine 110a transparent to the guest OS running on virtual machine 110a and users (e.g., a system administrator) of the source host 101a. Initially, as shown in FIG. 1, the source virtual machine 110a is managed by the source hypervisor 115a. In one embodiment, a process is provided wherein the source virtual machine 110a is migrated from the source hypervisor 115a residing on a source host OS 105a to a destination host 101b using at least one storage device 102.

Storage device 102 can be accessible by the source host 101a and by the destination host 101b. The storage device 102 can be networked storage (e.g., network attached storage (NAS), storage area network (SAN). The storage device 102 can be located with the source host, within the same network as the source host, with the destination host, within the same network 150 as the destination host, or with a third location.

The destination VM 110b can include one or more virtual machines 101B running under the control of a corresponding destination hypervisor 115b.

In one embodiment, the source hypervisor 115a may include a source migration agent 120a and the destination hypervisor 115b may include a corresponding destination migration agent 120b. The migration agent 120a, 120b can receive migration instructions from a host controller 125. The host controller 125 may reside on a designated computer system (e.g., a server computer, a desktop computer, etc.) or be part of the host machine 101a, 101b or another machine. Host controller 125 can manage virtual machine migration by issuing instructions to hypervisor 115a, 115b. The host controller 125 and migration agents 120 can work together to manage migrations, including determining a destination host machine 101b, coordinating one or more storage devices 102, scheduling migration, etc. Although shown as discrete components of the hypervisors 115a-115b, the migration agents 120a-120b may be separate components coupled to hypervisors 115a-115b.

The source migration agent 120a of the source hypervisor 115a can receive a request from a host controller 125 to migrate virtual machine 110a from the source host 101a to the destination host 101b. The host controller 125 can issue the request after a triggering event (e.g., a system administrator's migration request, system conditions, such as resource utilization by source host exceeding a threshold). Hypervisor 115a can facilitate mapping the memory of the virtual machine 110a on the source host machine 101a to a storage device 102. The memory mapping can occur at any time before and after the migration agent 120a receives a migration request. In one embodiment, the memory of the virtual machine is mapped on the storage device 102 on virtual machine boot (e.g., when the virtual machine is started). In one embodiment, migration agent 120a on hypervisor 115a can also cache at least a portion of memory of virtual machine 110a in a cache 140a on the source host machine 101a and point the virtual machine 110a to the cache 140a to cause at least some of memory accesses to occur on the source host machine 101a and not at the storage device 102. During a warm-up phase, migration agent 120a periodically performs a synchronization operation to synchronize the contents of the cache 140A with the mapped virtual machine memory on the storage device 102A. Based on the synchronization, migration agent 120a can detect whether changes in the state of the memory of the virtual machine 110 are no longer significant (e.g., are below threshold). For example, during warm-up, migration agent 120a can issue a synchronization command to synchronize the cache 140a and the memory mapped on the storage device 102. Through detecting the time it takes to synchronize, the migration agent 120a can determine whether the time to synchronize is below a threshold, or if the time to flush the cache is below a threshold, as described below, or any other methods. When the time to synchronize is below a threshold (e.g., memory accesses are no longer significant), migration agent 120a can issue a command to stop the virtual machine 110a on the source host machine 101a, thereby entering the stop-and-synchronize phase.

In another example of detecting changes in the state of the memory, migration agent 120a can use a synchronization command to flush data from the cache 140a and measure the time it takes to complete the flush operation. Flushing the cache 140a can include synchronizing the cache 140a and also invalidating the cache 140a. Through detecting the time it takes to complete the flush operation, the migration agent 120a can determine whether the time to flush is below a threshold. When the time to flush data from the cache 140a is below a threshold (e.g., there was an insignificant amount of data in the cache), migration agent 120a can issue a command to stop the virtual machine 110, thereby entering the stop-and-synchronize phase.

In yet another example of detecting changes in the state of the memory, migration agent 120a can also estimate downtime during the migration by determining the amount of data in the cache and predicting the amount of time synchronization would take for the determined amount of data. The smaller the amount of data, the shorter the predicted time to synchronize. When the predicted time to synchronize is below a threshold, migration agent 120a can issue a command to stop the virtual machine 110a on the source host machine 101a, thereby entering the stop-and-synchronize phase.

In the stop-and-synchronize phase, migration agent 120a can issue a command to stop the virtual machine 110a on the source host 101a. The migration agent 120a can also issue a command to synchronize the state of the memory mapped on the storage device 102 with the cache 140a. Migration agent 120a can receive a notification when the memory synchronization is complete.

After memory synchronization is complete, migration agent 120a can initiate the post-synchronize phase by issuing a command to suspend the virtual machine 110a at the source host 101a. The host controller 125 can instruct the destination host 101b to start a virtual machine 110b at any time before or during the post-synchronization phase. Memory for the virtual machine can be mapped on the storage device 102. When the virtual machine 110a at source host 101a is suspended, the source host 101a can transfer or migrate any remaining portion of the state of the virtual machine 110a to the destination host 101b. The remaining portion of the state of the virtual machine 110a can be a minimal execution state of the source virtual machine 110a. In an alternative implementation, the source host 101a can transmit the remaining portion of the virtual machine state to a storage device 102. Subsequently, the remaining portion of the virtual machine state can be transmitted from the storage device 102 to the destination host 101b at the request of a hypervisor 115, a migration agent 120, a host controller 125, or the destination host 101b. Once the destination host 101b obtains the state of the virtual machine 110a, virtual machine 110b can then resume at the destination host 101b using the obtained state of the virtual machine 110a.

In one implementation when the host machine 101a does not have a cache 140a, then migration agent 120a can skip the warm-up phase. In this implementation, the memory of the VM is mapped on the storage device 102. Host controller 125 can instruct destination hypervisor 115b or destination migration agent 120b to initiate a virtual machine 110b on destination host machine 101b and to map the memory of the virtual machine 110b on the storage device 102. The source virtual machine 110a is suspended and a minimal execution state of the source virtual machine 110a is transferred to the destination host 101b. The virtual machine 110b can then be resumed at the destination host 101b.

The "source" and "destination" designations for the hosts, hypervisors and migration agents are provided for reference purposes in illustrating example implementations of the migration process according to embodiments. It will be further appreciated that depending on the particulars of a given migration event, a hypervisor may at one time serve as the source hypervisor, while at another time the hypervisor may serve as the destination hypervisor.

Figure 2:
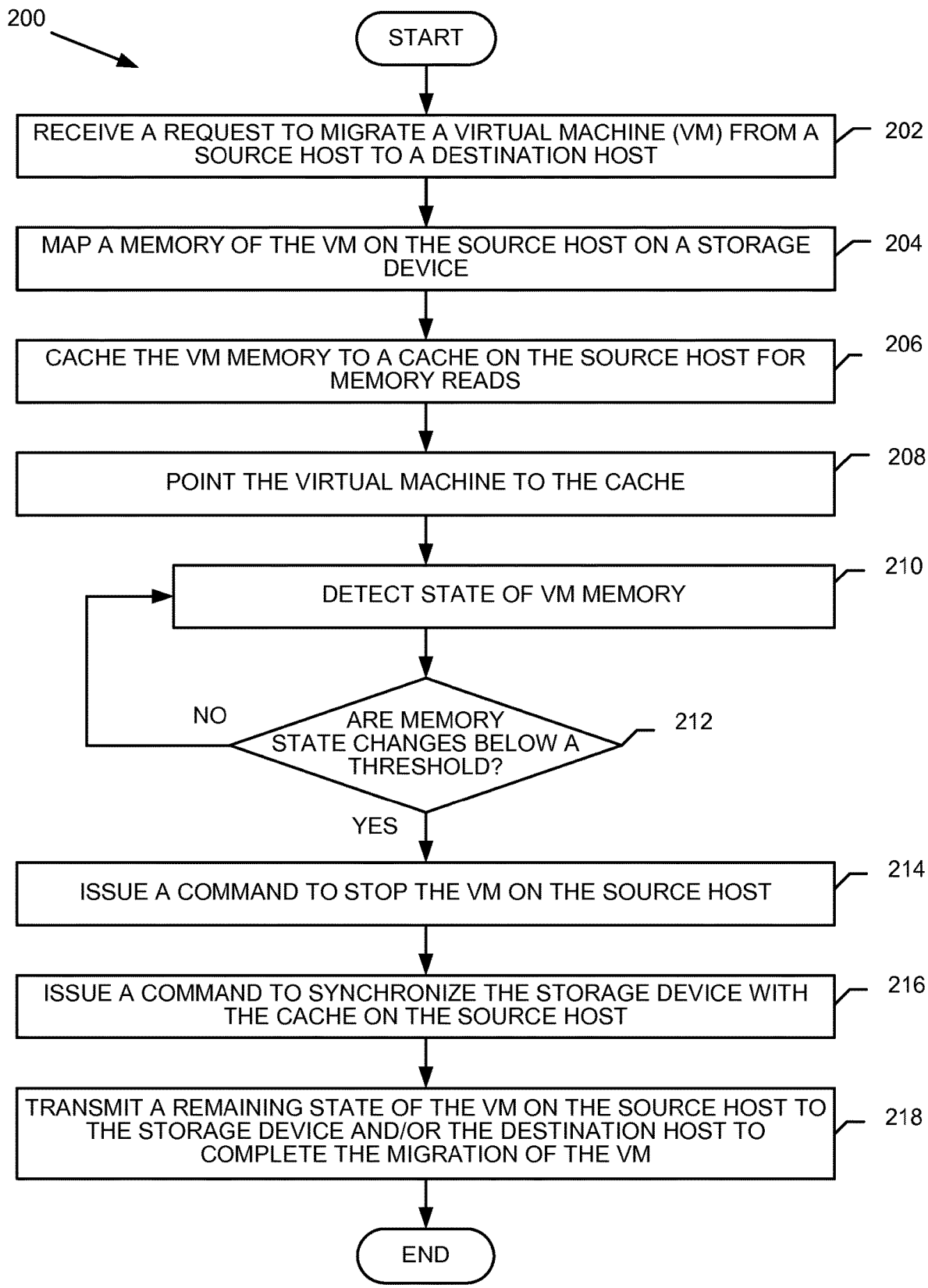
FIG. 2 is a flow diagram illustrating one embodiment of a method for live-migration of a virtual machine from a source host to a destination host using a storage device.

FIG. 2 is a flow diagram illustrating one embodiment of a method 200 for live-migration of a virtual machine from a source host to a destination host using a storage device. Although the method 200 is described in terms of live-migration of a virtual machine (e.g., 110a) residing on the source host (e.g., 101a) to a destination host (e.g., 101b) using a storage device (e.g., 102), the method 200 of FIG. 2 may be applied to migration of a virtual machine between any two hosts (101a-101n) over the network 103 or residing on the same host machine (e.g., source host 101a). Method 200 may be performed by processing logic (e.g., in computer system 400 of FIG. 4) that may comprise hardware (e.g., circuitry, dedicated logic, programmable logic, microcode, etc.), software (such as instructions run on a processing device), firmware, or a combination thereof. In one embodiment, method 200 is performed primarily by the source migration agent 120a residing within the source hypervisor 115a residing on the source host 101a of FIG. 1.

Referring to FIG. 2, in one embodiment, method 200 begins when, at block 202, a source migration agent on a source host receives a request to migrate a virtual machine from the source host to a destination host. The request can be received from a host controller that directs virtual machine migrations between host machines. The host controller can issue the request after a triggering event (e.g., a system administrator's migration request, a system conditions such as resource utilization of the source host raising above a threshold). At block 204, the hypervisor can map memory of the virtual machine on the source host on a storage device. The hypervisor can map the memory in response to the migration request. In another implementation, the virtual machine memory can be mapped at virtual machine boot (e.g., when the virtual machine is started), or the virtual machine memory can be mapped after boot and before migration.

At block 206, the hypervisor can cache the virtual machine memory, as described herein. In one embodiment, block 202 occurs after block 206. At block 206, the hypervisor can point the virtual machine to the cache to cause at least some of memory accesses to occur on the source host machine and not at the storage device.

During a warm-up phase, the hypervisor can detect changes in the state of the memory of the virtual machine (block 210). In one embodiment, the hypervisor detects the changes by periodically performing a synchronization operation to synchronize the contents of the cache with the mapped virtual machine memory on the storage device. For example, the hypervisor can issue one or more synchronization commands and measure the amount of time taken to complete a synchronization command.

At block 212, the hypervisor can determine whether the changes in the state of the memory of the virtual machine are below a threshold. For example, the hypervisor can make this determination by deciding whether the time it takes to synchronize memory is below a threshold, which indicates that memory accesses are no longer significant.

If the memory state changes are below a threshold, the hypervisor can issue a command to stop the virtual machine on the source host at block 214 and the hypervisor can switch to a stop-and-synchronize phase. Once the virtual machine is stopped, at block 216, the hypervisor can issue a synchronization command between the cache on the source host machine and the storage device. After memory synchronization is complete, the host controller can instruct a destination host machine to start a virtual machine at the destination host machine, to remove the mapping of the memory of the virtual machine on the storage device, and to map the memory for the virtual machine on the destination host machine on the storage device.

At block 218, the hypervisor can transmit a remaining state of the virtual machine on the source host to the destination host machine. Alternatively, the hypervisor can transmit the remaining state of the virtual machine to the storage device after the hypervisor enters a post-synchronize phase, where the destination host machine can retrieve the remaining state of the virtual machine from the storage device.

Figure 3:
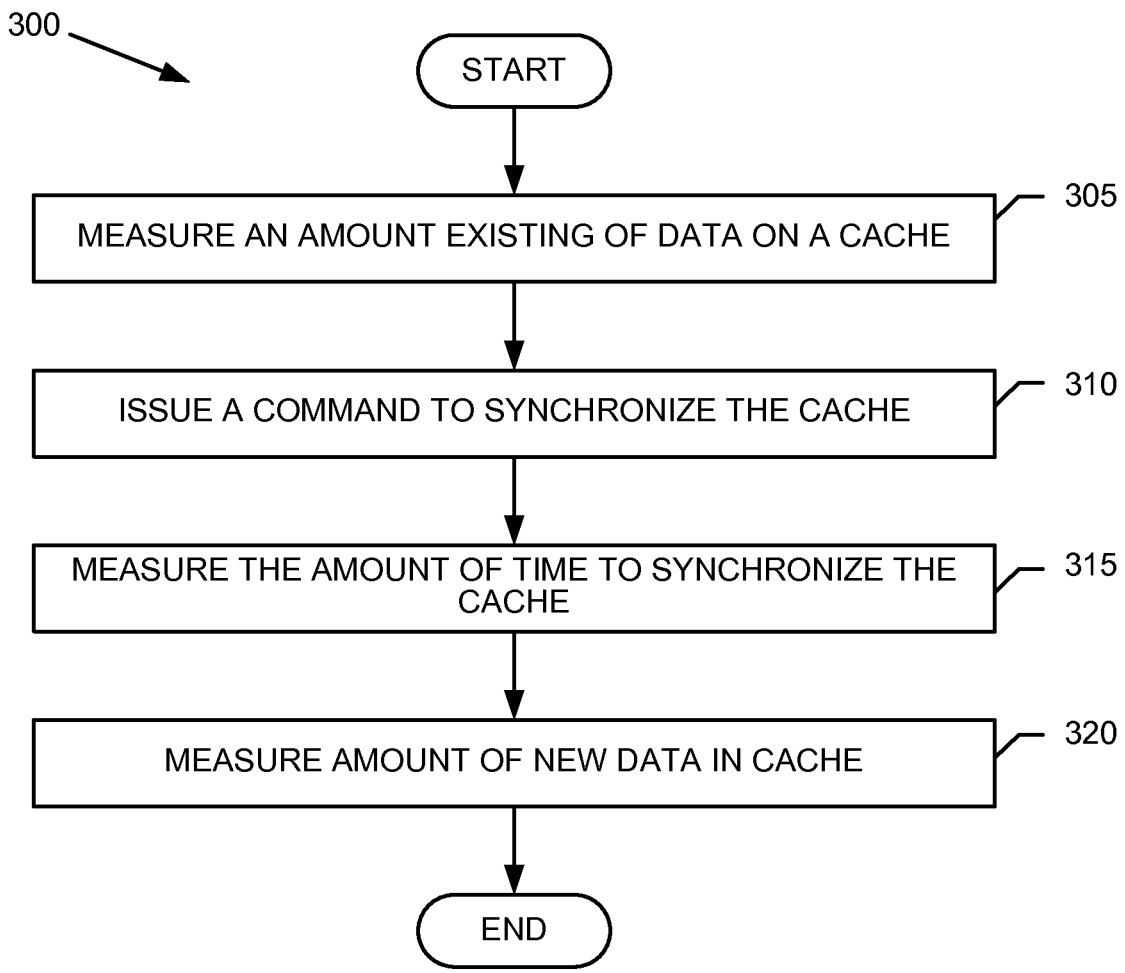
FIG. 3 is a flow diagram illustrating an embodiment of a method for detecting the state of virtual machine memory.

FIG. 3 is a flow diagram illustrating of an embodiment of detecting a state of virtual machine memory. Although the method 300 is described in terms of live-migration of a virtual machine (e.g., 110) residing on the source host 101a to a destination host (e.g., 101b) using a storage device (e.g., 102), the method 300 of FIG. 3 may be applied to migration of a virtual machine between any two hosts (101a-101n) over the network 103 or residing on the same host machine (e.g., source host 101a). Method 300 may be performed by processing logic (e.g., in computer system 400 of FIG. 4) that may comprise hardware (e.g., circuitry, dedicated logic, programmable logic, microcode, etc.), software (such as instructions run on a processing device), firmware, or a combination thereof. In one embodiment, method 300 is performed primarily by the source hypervisor 115a residing on the source host 101a of FIG. 1.

Referring to FIG. 3, in one embodiment, method 300 begins when, at block 305, the hypervisor at the source host machine measures an amount of existing data on a cache. The amount of existing data on the cache can be used to estimate the amount of time it may take to synchronize the data on the cache with a storage device. If the amount of data is small, the estimated time to synchronize is likely to be short so it can be a preferable time to migrate a virtual machine on the source machine to the destination machine. Likewise, if the cache has a large amount of data, the estimated time might be high and it may not be a preferable time to migrate the virtual machine.

At block 310, the hypervisor can issue a command to synchronize or flush the cache to make sure the data on the cache is written to the storage device. At block 315, the hypervisor can measure the amount of time it takes to synchronize or flush the cache and write to the storage device. If the amount of time to synchronize or flush is short, it can mean that the virtual machine on the source is in a less-active state and not writing a significant amount of data to the cache. This can be a preferable time to migrate the virtual machine from the source host to the destination host.

At block 320, the hypervisor can measure the amount of new data in the cache since the synchronize or flush at block 310. If the amount of data in the cache at block 320 is small, it can mean that the virtual machine on the source is in a less-active state and not writing a significant amount of data to the cache. This can be a preferable time to migrate the VM from the source host to the destination host.

Method 300 can be performed iteratively until the hypervisor determines it is ready to begin a post-synchronize phase or cold migration and suspend the source host machine. Hypervisor can determine to migrate when the virtual machine on the source is in a less-active state. With a small amount of activity in memory, the potential for data loss is lower than for when the virtual machine on the source is in an active state. Further, a time to migrate can be when downtime can be estimated to be within a threshold amount.

Figure 4:
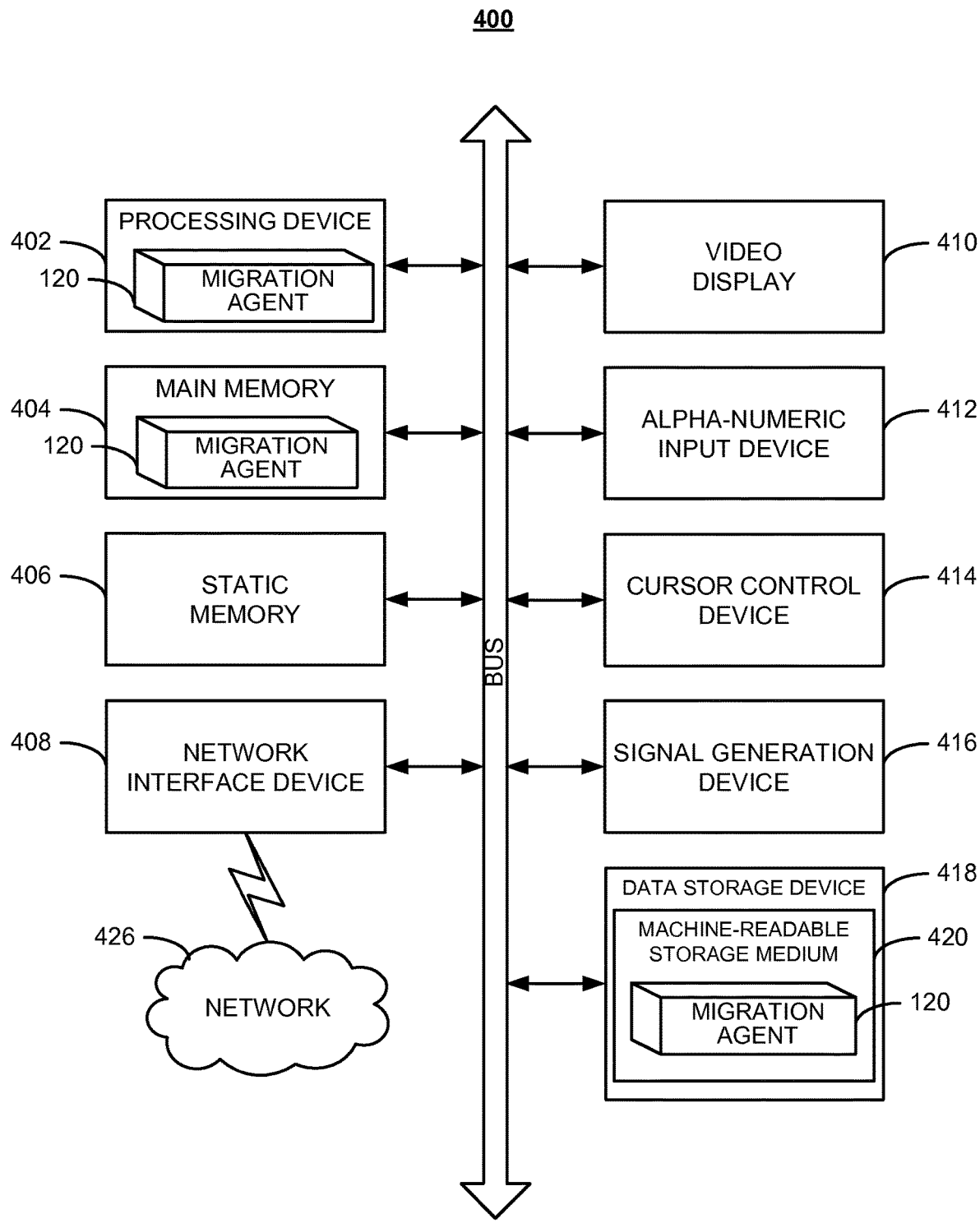
FIG. 4 illustrates a diagrammatic representation of a machine in an example form of a computer system within which a set of instructions, for causing the machine to perform any one or more of the methodologies discussed herein, may be executed.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the migration agent 120 for performing the operations and steps discussed herein.

Computer system 400 may further include a network interface device 408. Computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 420 having one or more sets of instructions (e.g., the migration agent 120) embodying any one or more of the methodologies of functions described herein. The migration agent 120 may also reside, completely or at least partially, within main memory 404 and/or within processing device 402 during execution thereof by computer system 400; main memory 404 and processing device 402 also constituting machine-readable storage media. The migration agent 120 may further be transmitted or received over a network 426 via network interface device 408.

Machine-readable storage medium 420 may also be used to store the device queue manager logic persistently. While machine-readable storage medium 420 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "issuing", "measuring", "caching", "monitoring", "mapping", "estimating", "calculating", "disabling", "detecting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    receiving a request to migrate a virtual machine from a source host to a destination host;
    mapping, by the source host, a memory of the virtual machine to a storage device accessible over a network by the source host and by the destination host;
    caching, by the source host, a portion of a state of the virtual machine to generate cached data;
    measuring an amount of the cached data;
    subsequent to the measuring of the amount of the cached data, issuing a synchronization command to flush the cached data by synchronizing the portion of the state of the virtual machine with the storage device;
    measuring an amount of time to flush the cached data;
    determining whether an estimated time period to synchronize with the storage device is below a threshold time period in view of one or more of the amount of the cached data prior to flushing the cached data, the amount of time to flush the cached data, or an amount of new cached data subsequent to the flushing of the cached data;
    responsive to determining that the estimated time period to synchronize is below the threshold time period, stopping the virtual machine on the source host; and
    starting the virtual machine on the destination host.

2. The method of claim 1, wherein the caching of the portion of the state of the virtual machine comprises:
    storing, in local memory on the source host, the portion of the state of the virtual machine, wherein the synchronization command is to store on the storage device the portion that is stored in the local memory.

3. The method of claim 1 further comprising:
    determining whether the virtual machine is to access the mapped memory on the storage device or a local memory of the source host;
    in response to determining that the virtual machine is to access the local memory, directing the virtual machine to the local memory to cause memory accesses of the virtual machine to occur at the local memory on the source host; and
    in response to determining that the virtual machine is to access the mapped memory on the storage device, accessing the mapped memory of the virtual machine on the storage device.

4. The method of claim 1, wherein the request is issued responsive to a triggering event of a system condition of the source host.

5. The method of claim 1, wherein the mapping of the memory of the virtual machine to the storage device is responsive to starting the virtual machine on the source host.

6. The method of claim 1 further comprising:
    estimating an amount of downtime to migrate the virtual machine in view of the estimated time period to synchronize, wherein the stopping of the virtual machine on the source host is further responsive to determining that the estimated amount of downtime is less than a threshold amount of downtime.

7. The method of claim 1 further comprising:
transmitting a remaining portion of the state of the virtual machine from the source host to the destination host to complete migration of the virtual machine, wherein the remaining portion of the state of the virtual machine comprises at least one of: a CPU register, a register of a network card exposed to the virtual machine, or a device accessible to the virtual machine.

8. A system comprising:
a memory; and
a processing device, operatively coupled with the memory, to:
receive a request to migrate a virtual machine from a source host to a destination host;
map, by the source host, first memory of the virtual machine to a storage device accessible over a network by the source host and by the destination host;
cache, by the source host, a portion of a state of the virtual machine to generate cached data;
measure an amount of the cached data;
subsequent to measuring the amount of the cached data, issue a synchronization command to flush the cached data by synchronizing the portion of the state of the virtual machine with the storage device;
measure an amount of time to flush the cached data;
determine whether an estimated time period to synchronize with the storage device is below a threshold time period in view of one or more of the amount of the cached data prior to flushing the cached data, the amount of time to flush the cached data, or an amount of new cached data subsequent to the flushing of the cached data;
responsive to determining that the estimated time period to synchronize is below the threshold time period, stop the virtual machine on the source host; and
start the virtual machine on the destination host.

9. The system of claim 8, wherein to cache the portion of the state of the virtual machine, the processing device is to:
store, in local memory on the source host, the portion of the state of the virtual machine, wherein the synchronization command is to store on the storage device the portion that is stored in the local memory.

10. The system of claim 8, wherein the processing device is further to:
determine whether the virtual machine is to access the mapped first memory on the storage device or a local memory of the source host;
in response to determining that the virtual machine is to access the local memory, direct the virtual machine to the local memory to cause memory accesses of the virtual machine to occur at the local memory on the source host; and
in response to determining that the virtual machine is to access the mapped first memory on the storage device, access the mapped first memory of the virtual machine on the storage device.

11. The system of claim 8, wherein the request is issued responsive to a triggering event of a system condition of the source host.

12. The system of claim 8, wherein the processing device is to map the first memory of the virtual machine to the storage device responsive to starting the virtual machine on the source host.

13. The system of claim 8, wherein the processing device is further to:
estimate an amount of downtime to migrate the virtual machine in view of the estimated time period to synchronize, wherein the processing device is to stop the virtual machine on the source host further responsive to determining that the estimated amount of downtime is less than a threshold amount of downtime.

14. The system of claim 8, wherein the processing device is further to:
transmit a remaining portion of the state of the virtual machine from the source host to the destination host to complete migration of the virtual machine, wherein the remaining portion of the state of the virtual machine comprises at least one of: a CPU register, a register of a network card exposed to the virtual machine, or a device accessible to the virtual machine.

15. A non-transitory computer readable storage medium comprising instructions that, when executed by a processing device, cause the processing device to:
receive a request to migrate a virtual machine from a source host to a destination host;
map, by the source host, a memory of the virtual machine to a storage device accessible over a network by the source host and by the destination host;
cache by the source host, a portion of a state of the virtual machine to generate cached data;
measure an amount of the cached data;
subsequent to measuring the amount of the cached data, issue a synchronization command to flush the cached data by synchronizing the portion of the state of the virtual machine with the storage device;
measure an amount of time to flush the cached data;
determine whether an estimated time period to synchronize with the storage device is below a threshold time period in view of one or more of the amount of the cached data prior to flushing the cached data, the amount of time to flush the cached data, or an amount of new cached data subsequent to the flushing of the cached data;
responsive to determining that the estimated time period to synchronize is below the threshold time period, stop the virtual machine on the source host; and
start the virtual machine on the destination host.

16. The non-transitory computer readable storage medium of claim 15, wherein to cache the portion of the state of the virtual machine, the processing device is to:
store, in local memory on the source host, the portion of the state of the virtual machine, wherein the synchronization command is to store on the storage device the portion that is stored in the local memory.

17. The non-transitory computer readable storage medium of claim 15, wherein the processing device is further to:
determine whether the virtual machine is to access the mapped memory on the storage device or a local memory of the source host;
in response to determining that the virtual machine is to access the local memory, direct the virtual machine to the local memory to cause memory accesses of the virtual machine to occur at the local memory on the source host; and
in response to determining that the virtual machine is to access the mapped memory on the storage device, access the mapped memory of the virtual machine on the storage device.

18. The non-transitory computer readable storage medium of claim 15, wherein the request is issued responsive to a triggering event of a system condition of the source host.

19. The non-transitory computer readable storage medium of claim 15, wherein the processing device is to map the memory of the virtual machine to the storage device responsive to starting the virtual machine on the source host.

20. The non-transitory computer readable storage medium of claim 15, wherein the processing device is further to:
   estimate an amount of downtime to migrate the virtual machine in view of the estimated time period to synchronize, wherein the processing device is to stop the virtual machine on the source host further responsive to determining that the estimated amount of downtime is less than a threshold amount of downtime.

* * * * *